May 2, 1944.  I. E. McCABE  2,348,083
VALVE CONSTRUCTION
Filed Nov. 30, 1942
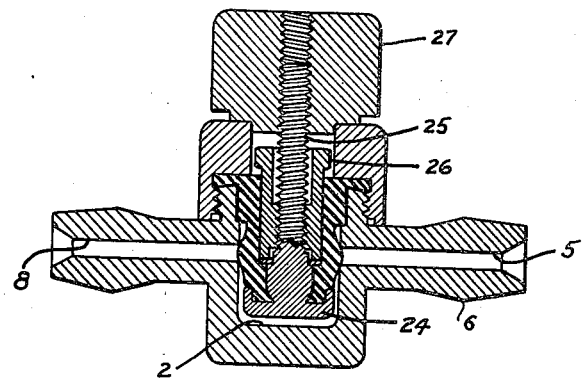
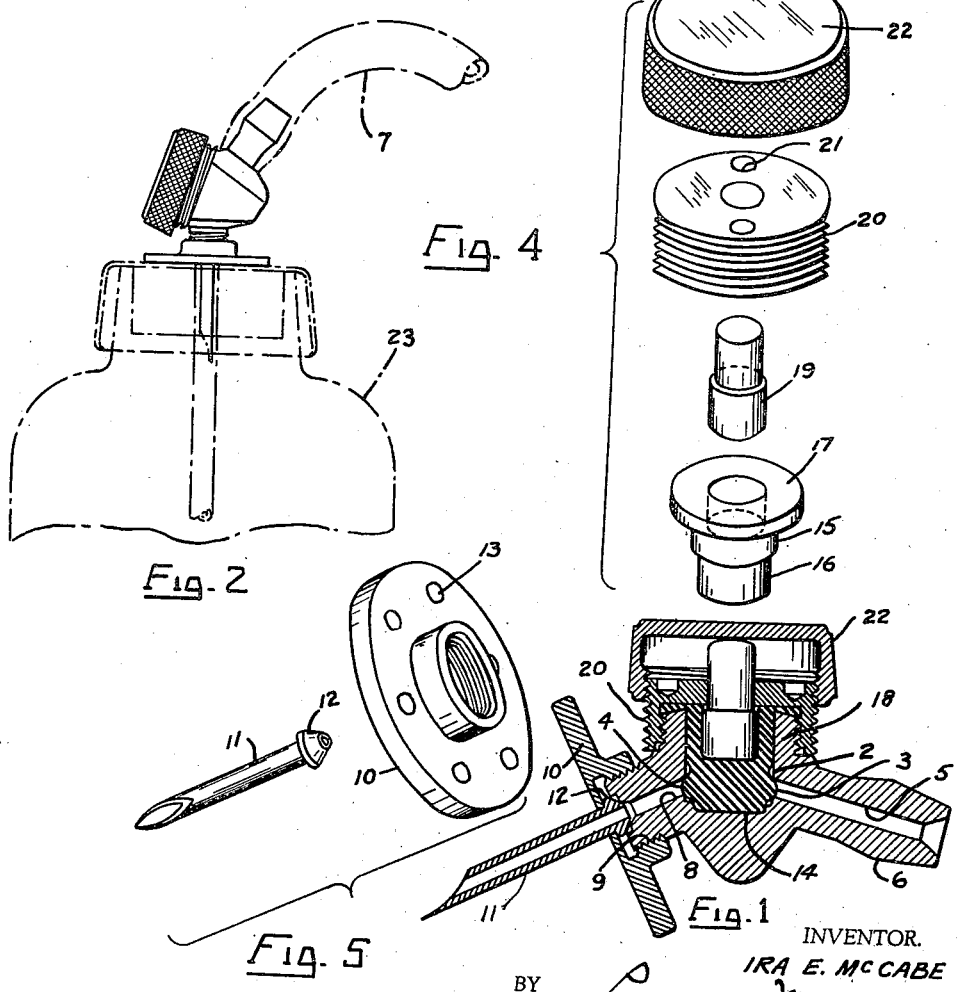
INVENTOR.
IRA E. McCABE
BY
ATTORNEY.

Patented May 2, 1944

2,348,083

UNITED STATES PATENT OFFICE 2,348,083

VALVE CONSTRUCTION

Ira E. McCabe, Chicago, Ill.

Application November 30, 1942, Serial No. 467,441

2 Claims. (Cl. 251—122)

This invention relates to improvements in valves and more particularly to the construction of a small valve particularly adapted for use in vacuum systems, where it is essential that a very small flow through the valve may be controlled, as well as for medicinal purposes such as for controlling the flow of fluid in connection with intravenous injections, blood extractions and blood transfusions.

It is an object of this invention to construct a valve of this character having an air tight valve chamber with valve operating members of such a form as to eliminate the necessity of highly machined and close fitting surfaces as between the valve, valve seat and operating parts, whereby the cost of manufacture may be reduced by utilizing standard commercial machines.

It is a further object of this invention to provide a valve chamber of minimum volume with a valve member for regulating the flow of fluid therethrough of such conformation that cleaning and sterilizing of the valve is rendered simple and possible to the highest degree. When the valve is used for medical purposes where intervals of time occur between successive operations of the valve and in cases where change of fluid is made, plasma may clot and contaminate the passages through the valve so that a valve for this purpose must be thoroughly cleaned and completely sterilized from time to time and upon a change of fluid. For that reason this improved valve construction is particularly adaptable for such medical uses.

Another advantage is that the valve member is readily interchangeable with new members without the necessity of closely fitting the contacting surfaces.

Furthermore, this invention provides for the construction of a small compact valve, light in weight, which may be easily assembled and disassembled to provide means of flow adjustment under sealed conditions in which very minute flow through the valve may be regulated, made possible by the small displacement of the valve chamber.

This valve structure also may be used to great advantage in connection with the manufacture of gaseous filled vapor lamps and the manufacture of enclosed mercury tube switches and other evacuated containers where, upon the evacuation of the air, a critical amount of gas is thereafter admitted.

With these and other objects in view, reference is made to the accompanying sheet of drawings which illustrates preferred forms of this invention with the understanding that minor detail changes may be made without departing from the scope thereof.

In the drawing:

Figure 1 is a view in longitudinal vertical central section of a complete valve.

Figure 2 is a fragmentary view in elevation illustrating the use of this valve for controlling the flow of fluid into a sealed container illustrated in dot and dash lines and illustrating the attached fluid conduit in dot and dash lines.

Figure 3 is a view in vertical longitudinal central section of a modified form of this valve.

Figure 4 is an exploded view showing the valve member, compression pin, sealing cap and adjusting knob projected above Figure 1.

Figure 5 is an exploded view showing the flanged, recessed nut and shouldered needle projected from Figure 1.

This invention contemplates the use of a cylindrical valve member normally positioned to be out of contact with the walls of the valve chamber to permit the flow of fluid from the fluid inlet about the valve member and through the fluid outlet. This invention also contemplates the making of the valve member of rubber, plastic or other composition which may be expanded and which will normally contract thereafter. This invention contemplates the use of means to expand the valve member to close the inlet and outlet ports to the valve chamber to check the flow of the fluid therethrough.

As shown in Figure 1, the body 1 of the valve is provided with a cylindrical valve chamber 2 extending downwardly from the top of the body having diametrically disposed ports 3 and 4. The inlet port 3 opens from an inlet passage 5 which extends through a projection of the valve body 1 having an oppositely tapered enlargement 6 for engagement with a conduit or pipe 7, shown in dot and dash lines in Figure 2. The outlet port 4 opens from an outlet passage 8 in an extension of the valve body 1 which terminates in a screw threaded portion 9 adapted to be engaged by a flanged recessed nut 10 centrally perforated to receive a shoulder needle 11 of the same inner diameter as the outlet passage 8 and by engagement with the shoulder 12 on the needle seat the needle in a recess about the outlet passage 8. It is preferable to provide openings 13 in the flange of the nut 10 for engaging a tool to facilitate the tightening of the parts in place and insure an air tight and sealed joint.

The valve member 14 is preferably of rubber, resilient plastic or other expansible and contractible composition of cylindrical formation having a shoulder 15 about its upper end snugly engaging the cylindrical walls of the chamber 2 with the bottom of the reduced portion 16 snugly received in a recess in the bottom of the valve chamber 2. The upper portion of the valve member is provided with an outstanding flange 17 extending over and in engagement with an externally screw threaded boss 18 extending upwardly from the body 1. The upper portion of the valve member is centrally recessed to the depth of the shoulder 15 to receive the shouldered portion of a cylindrical compression pin 19, the reduced portion of which passes centrally through a sealing cap 20, said cap having a flat surface to engage the flange 17 of the valve member 14 and depending internally screw threaded walls to be engaged with threaded portion 18 of the body to hold the valve member in sealed relation upon the body of the valve. It is preferable to provide the upper surface of the cap 20 with depressions 21 for receiving a tool to facilitate the engagement with the flange of the valve member. In order to operate the compression pin to expand the reduced portion of the valve member to close the valve ports a hollow adjusting knob 22 is threaded over the sealing cap 20 so that as the knob is threaded onto the cap, the pin will be forced downwardly to compress and expand the valve member to close the ports 3 and 4. Upon being moved in the opposite direction and the pressure being released, the resiliency of the valve member will force the pin upwardly and also contract the lower portion to open the valve ports.

As heretofore stated, this valve construction may be used advantageously for controlling the fluid for intravenous injections, blood extractions and blood transfusions. Figure 2 illustrates the application of this valve in connection with blood extractions wherein the blood is collected in the bottle 23 indicated in dot and dash l'nes. These bottles are highly evacuated and there is therefore the need of controlling the flow of blood withdrawn from the veins to the bottle. If too large a flow is permitted the high vacuum will suck the veins flat thus pinching off the flow through the vein. With this valve the flow may be limited and properly controlled. The opening of bottles of this character are covered with an air tight seal and the needle 11 pierces the seal with the flange of the nut 10 engaging the upper surface whereby the blood is allowed to flow in a very small stream so that it may be said to trickle or leak through the valve.

Figure 3 illustrates a modified form of this valve in which the rubber or expansible and contractible valve member 14 is compressed from the bottom instead of from the top. In this construction the bottom of the reduced portion 16 of the valve member is received in a cupped valve stem 24 which has a threaded portion 25 extending axially through the valve member to the exterior of the main body. The lower portion of the valve member is secured in the cupped valve stem by enlarging the bore within the valve member about the threaded stem and threading thereon a follower block 26 to engage the body of the valve member and hold it firmly in engagement with the interior of the cup. In this form of this invention, the sealing cap is provided with an axial aperture to receive the top of the follower block and allow the threaded valve stem to pass therethrough. A compressing nut 27 is threaded upon the upper end of the threaded valve stem.

When desired to close the valve, the nut is turned, raising the valve stem which places the expansible and contractible valve member under compression causing it to expand and close the inlet and outlet ports of the valve chamber. The bottom of the valve chamber is of such depth so that when the valve is opened by rotating the nut in the opposite direction the returning of the valve member to its normal conformation will cause the bottom of the cup to rest upon the bottom of the chamber. In this form the inlet and outlet passages 5 and 8 are arranged axially on opposite sides of the valve chamber and the surrounding projections from the valve body are each provided with tapered enlargements 6 for engagement with conduits.

From the above it is obvious that a very simple valve for the purposes described is provided. It consists of a body having a chamber with an expansible and contractible valve member contained in the chamber in air tight relation to the body whereby when this member is in its normal contracted condition the fluid may pass through the ports and the space between the chamber and valve member. Upon placing the valve member under compression it is caused to expand and gradually close the ports whereby manipulation of the compression knob or nut may provide very minute variations in the area of the ports to be closed off to give very close regulation of the fluid flow through the valve.

What I claim is:

1. A valve for controlling the flow of fluid in blood collection, blood transfusion and plasma aspiration, including a valve casing having a cylindrical valve chamber with oppositely disposed in-let and out-let ports adjacent the bottom thereof, a cylindrical expansible and contractible valve member snugly received within the chamber having a reduced portion with the lower end in engagement with a recess provided therefore in the bottom of the chamber normally allowing a circulation of fluid from one port through the other between the valve member and chamber, said member provided with an annular flange at the upper end extending over and in engagement with the top of the valve chamber, the upper portion of the member provided with a concentric depression extending downwardly through the thicker portion of the member, a sealing plate threaded upon the exterior of the casing to seal the annular flange to the casing, a cylindrical operating member snugly received within the recess in the said valve member having a reduced upper portion extending through an aperture provided therefore in the sealing plate, and an operating cap threaded upon the exterior of the sealing plate adapted to engage the exterior end of the operating member, whereby rotation of the cap in one direction forces the valve member against the bottom of the casing causing it to expand and seal the ports and rotation in the opposite direction relieves the pressure to allow the valve member to contract and open the ports.

2. The structure of claim 1, wherein one port is provided with an extension for attachment to a conduit and the other port is provided with a detachable hollow needle.

IRA E. McCABE.